United States Patent [19]

Yoshida et al.

[11] Patent Number: 4,511,681

[45] Date of Patent: Apr. 16, 1985

[54] PROCESS FOR PRODUCING A POLYIMIDE SOLUTION

[75] Inventors: Masatoshi Yoshida, Oyama; Yasuo Miyadera, Shimodate, both of Japan

[73] Assignee: Hitachi Chemical Company, Tokyo, Japan

[21] Appl. No.: 489,178

[22] Filed: Apr. 27, 1983

[30] Foreign Application Priority Data

Apr. 27, 1982 [JP] Japan .................................. 57-70923

[51] Int. Cl.³ ........................ C08G 73/10; C08K 5/13; C08L 79/08
[52] U.S. Cl. .................................... 523/310; 524/738; 524/741; 524/879
[58] Field of Search ....................... 524/879, 738, 741; 523/310

[56] References Cited

U.S. PATENT DOCUMENTS

| | | | |
|---|---|---|---|
| 3,277,043 | 10/1966 | Holub | 524/879 |
| 3,424,718 | 1/1969 | Angelo | 524/879 |
| 3,441,532 | 4/1969 | Victorius | 524/879 |
| 3,459,706 | 8/1969 | Schweitzer | 524/879 |
| 3,692,740 | 9/1972 | Suzuki | 524/741 |
| 3,726,834 | 4/1973 | Acle | 524/879 |
| 3,954,710 | 5/1976 | Bower | 524/879 |
| 4,290,936 | 9/1981 | Sasaki et al. | 524/879 |

Primary Examiner—C. Warren Ivy
Attorney, Agent, or Firm—Antonelli, Terry & Wands

[57] ABSTRACT

A transparent and homogeneous polyimide resin solution produced by a process in which a tetracarboxylic acid component and an aromatic diamine component are subjected to polymerization and imidization by one step at 100° to 200° C. by use of a halogenated phenolic compound as a solvent, permits the formation of a polyimide film excellent in mechanical properties.

16 Claims, 2 Drawing Figures

PROCESS FOR PRODUCING A POLYIMIDE SOLUTION

This invention relates to a process for producing a polyimide solution soluble in halogenated phenolic compounds.

As a process for producing a polyimide, there has heretofore been employed a process which comprises addition reacting a tetracarboxylic acid dianhydride with an aromatic diamine in an organic polar solvent at 60° C. or lower to prepare a polyamide-acid, molding the polyamide-acid, and then converting it to a polyimide by means of a dehydrating agent or heat (U.S. Pat. Nos. 3,179,614, 3,179,630 and 3,179,634). In U.S. Pat. No. 3,190,856 there is disclosed a two-step process by which a polyamide-acid is prepared by using a benzophenonetetracarboxylic acid as a tetracarboxylic acid component, and the polyamide-acid is then converted to a polyimide. According to U.S. Pat. No. 3,264,250, there is disclosed a production process in which a polyamide-acid is prepared by using pyromellitic acid dianhydride and 3,3',4,4'-benzophenonetetracarboxylic acid dianhydride in a specific proportion and the polyamide-acid converted to polyimide. Further, there is disclosed in British Pat. No. 2,075,999 a process for producing a polyamide-acid a part of which is converted to a polyimide, in an unhalogenated phenolic solvent.

There have been proposed processes for obtaining polyimide solutions by one step by reacting a tetracarboxylic acid with an aromatic diamine in unhalogenated cresol. For example, in U.S. Pat. No. 3,666,709 there is disclosed a process in which an aromatic diamine having an alkyl group, halogen group or the like in a position ortho to at least 60 mole % of the amino groups is reacted with benzophenonetetracarboxylic acid dianhydride in unhalogenated cresol at a temperature of 160° C. or lower. In Japanese patent application Kokoku (Post-Exam Publn) No. 14,751/72 is disclosed a process for producing a polyimide by using 1,2,3,4-butanetetracarboxylic acid as a tetracarboxylic acid component. According to the well-known references described above, the dissolution in unhalogenated cresol is conducted by the employment of an aromatic diamine capable of disrupting the crystallinity of the resin or by the introduction of an aliphatic tetracarboxylic acid. Further, in Japanese patent application Kokai (Laid-Open) No. 7,805/80 is disclosed a process for producing a polyamide-acid by reacting 4,4'-diaminodiphenyl ether and p-phenylenediamine as aromatic diamine components with 3,3',4,4'-biphenyltetracarboxylic acid as a tetracarboxylic acid component in an organic polar solvent (e.g., N-methylpyrrolidone, cresol or the like) at 80° C. or lower.

As a case where a halogenated phenolic compound is used, there is disclosed in U.S. Pat. No. 3,277,043 a process for producing a polyamide-acid. As a process for directly obtaining a polyimide solution, there is disclosed in U.S. Pat. No. 4,290,936 a case where at least 80 mole % of a 3,3',4,4'-biphenyltetracarboxylic acid is used.

However, it is described in the heretofore mentioned U.S. Pat. No. 3,277,043 that when p-phenylenediamine is used as an aromatic diamine component, even the reaction product in the stage of a polyamide-acid is insoluble in phenols. It is described in U.S. Pat. No. 4,290,936 that when less than 80 mole % of 3,3',4,4'-biphenyltetracarboxylic acid is used, no polyimide film excellent in mechanical properties can be formed from the resulting polyimide solution, and no homogeneous polyimide solution can be obtained, for example, because a polyimide deposits during polymerization. It has heretofore been considered that when conventional 3,3',4,4'-benzophenonetetracarboxylic acid and/or pyromellitic acid is used as a tetracarboxylic acid component, or when p-phenylenediamine is used, there can be obtained no transparent and homogeneous polyimide solution and a polyimide film excellent in mechanical properties cannot be formed from this solution.

An object of this invention is to improve the disadvantages of the well-known processes described above and to provide a process for producing a transparent and homogeneous polyimide solution from which a polyimide film excellent in mechanical properties can be formed.

This invention provides a process for producing a homogeneous polyimide resin solution which comprises effecting polymerization and imidization in one step at a reaction temperature of 100° to 200° C. in the presence of a halogenated phenolic compound as a solvent by using a tetracarboxylic acid component comprising at least 50 mole % of 3,3',4,4'-benzophenonetetracarboxylic acid or a derivative thereof and 50 mole % or less of pyromellitic acid or a derivative thereof and an aromatic diamine component comprising at least 75 mole % of 4,4'-diaminodiphenyl ether and 25 mole % or less of p-phenylenediamine, both the tetracarboxylic acid component and the aromatic diamine component being used in approximately equimolar amounts.

Figure 1:
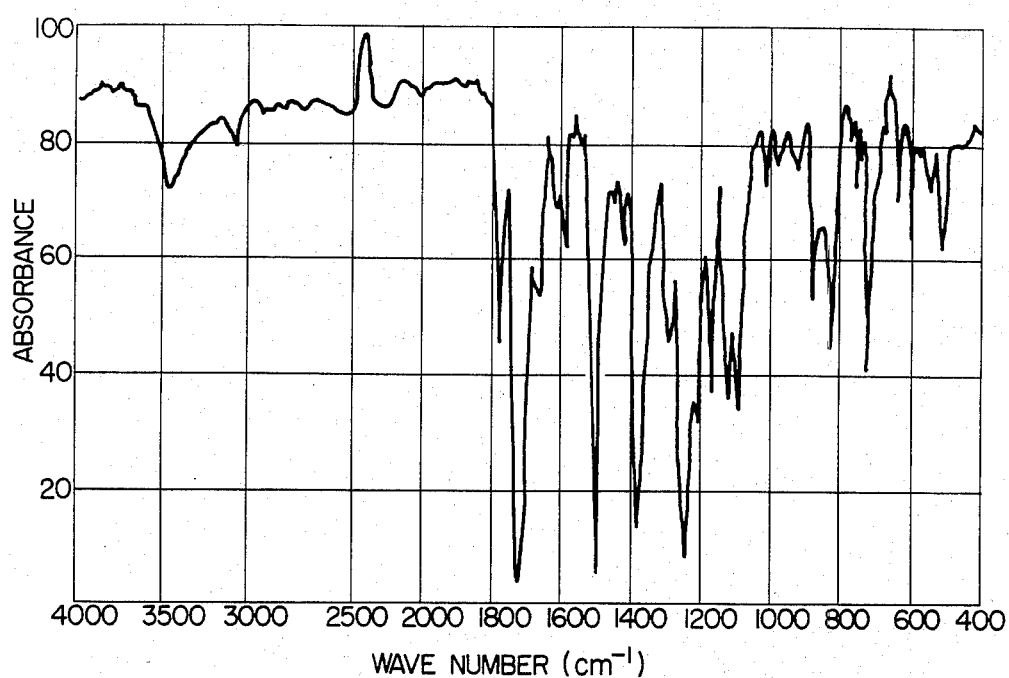
FIG. 1 is an infrared spectroscopic analysis chart of a polyimide obtained according to Example 1.

According to this invention, there can be obtained a polyimide having a conversion to imide of 90% or more, particularly 95% or more, more particularly 98% or more.

As to the concentration of the polyimide solution according to this invention, a homogeneous and transparent polyimide solution can directly be obtained at various concentrations up to 25% by weight. This polyimide solution can freely be diluted with a halogenated phenolic compound, and it is also possible to concentrate it by removing the halogenated phenolic compound by various methods.

Further, since the tetracarboxylic acid component comprises 3,3',4,4'-benzophenonetetracarboxylic acid or a derivative thereof as the main constituent, two benzene rings are bonded to each other through a carbonyl group, and therefore the resulting polyimide solution has a lowered viscosity, so that there can be obtained a polyimide solution excellent in workability at the time of film production, i.e. excellent in filtration, flowing and spreading of the solution, and the like as compared with a case where 3,3',4,4'-biphenyltetracarboxylic acid or a derivative thereof is used.

This invention is more concretely explained below.

As the tetracarboxylic acid component used in this invention, there is used a mixture comprising at least 50 mole %, preferably 65 mole % or more, more preferably 70 to 90 mole % of 3,3',4,4'-benzophenonetetracarboxylic acid or an anhydride or an ester derivitive thereof and 50 mole % or less, preferably 35 mole % or less, more preferably 30 to 10 mole % of pyromellitic acid or an anhydride or an ester derivative thereof.

With an increase of the proportion of pyromellitic acid or a derivative thereof, the glass transition temperature of the resulting polymer becomes higher, but the production of the polymer becomes difficult. When the amount of 3,3',4,4'-benzophenonetetracarboxylic acid or a derivative thereof is less than 50 mole %, or when pyromellitic acid or a derivative thereof is used in an amount of more than 50 mole %, a polymer insoluble in halogenated phenolic compounds deposits in the course of the reaction, or the reaction solution becomes clouded when cooled; this is not desirable.

As the derivative of 3,3',4,4'-benzophenonetetracarboxylic acid, there can be used 3,3',4,4'-benzophenonetetracarboxylic acid anhydrides and esterification products thereof such as methyl and ethyl esters thereof, and in particular, 3,3',4,4'-benzophenonetetracarboxylic acid dianhydride (hereinafter abbreviated as "BTDA") is preferable.

As the derivative of pyromellitic acid, there can be used pyromellitic acid anhydrides and esterification products thereof such as methyl and ethyl esters thereof, and in particular, pyromellitic acid dianhydride (hereinafter abbreviated as "PMDA") is preferable.

Together with the above-mentioned 3,3',4,4'-benzophenonetetracarboxylic acid and derivatives thereof and pyromellitic acid and derivatives thereof, there may be used other tetracarboxylic acids, for example, 3,3',4,4'-biphenyltetracarboxylic acid and derivatives thereof, 2,3,3',4'-biphenyltetracarboxylic acid and derivatives thereof, 2,2',3,3'-biphenyltetracarboxylic acid and derivatives thereof, bis(3,4-dicarboxyphenyl)methane and derivatives thereof, 2,2-bis(3,4-dicarboxyphenyl) propane and derivatives thereof, bis(3,4-dicarboxyphenyl) thioether and derivatives thereof, bis(3,4-dicarboxyphenyl) sulfone and derivative thereof, 2,3,6,7-naphthalenetetracarboxylic acid and derivative thereof, etc. The term "derivatives" include anhydrides, dianhydrides, esters (e.g. methyl, ethyl esters) of these tetracarboxylic acids. Among them, tetracarboxylic acid dianhydrides are particularly preferable.

In this invention, as the aromatic diamine component, there is used a mixture comprising at least 75 mole %, preferably 80 mole % or more, more preferably 85 mole % or more of 4,4'-diaminodiphenyl ether (hereinafter abbreviated as "DDE") and 25 mole % or less, preferably 20 mole % or less, more preferably 20 to 5 mole % of p-phenylenediamine (hereinafter abbreviated as "PPD").

When the amount of DDE is less than 75 mole % or when PPD is used in an amount of more than 25 mole %, a polymer insoluble in halogenated phenolic compounds deposits in the course of the reaction, or the reaction solution shows white turbidity when cooled; this is not desirable.

Together with the aforesaid DDE and PPD, there may be used other aromatic diamine components, for example, 4,4'-diaminodiphenylmethane, 4,4'-diaminodiphenylpropane, 3,3'-dimethylbenzidine, 4,4'-diaminodiphenylsulfide, 4,4'-diaminodiphenylsulfone, m-phenylenediamine, 3,3'-diaminodiphenylmethane, 3,3'-diaminodiphenyl ether, 3,3'-diaminodiphenyl sulfide, 3,3'-diaminodiphenylsulfone, etc.

In this invention, as to the ratio between the used amounts of the above-mentioned tetracarboxylic acid component and aromatic diamine component, they are used in about equimolar amounts, and the polymerization and imidization are effected by one step. However, the used amounts of the two components need not necessarily be equal, and one of the components may be used in excess of the other component, so long as the surplus is 10 mole % or less, preferably 5 mole % or less.

As the halogenated phenolic compound used as a reaction solvent in this invention, there may be used any of those in which a hydroxyl group and a halogen atom are directly linked to carbon constituting a benzene ring, and those having a melting point of 100° C. or lower, preferably 80° C. or lower and a boiling point of 300° C. or lower, preferably 280° C. or lower are preferred. Although the halogen atom linked to the benzene ring is not limited, chlorine or bromine is preferable. The halogenated phenolic compound may also contain one or more substituents other than a halogen atom and a hydroxyl group, for example, a lower alkyl group such as methyl, ethyl, propyl or the like can be linked to a carbon atom of the benzene ring.

In this invention, as the halogenated phenolic compound, there may be exemplified o-chlorophenol, m-chlorophenol, p-chlorophenol, o-bromophenol, m-bromophenol, p-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 2,4-dichlorophenol, 2,6-dichlorophenol, 2,4,6-trichlorophenol, 2,4,6-tribromophenol, etc.

In this invention, p-chlorophenol, m-chlorophenol, p-bromophenol, m-bromophenol, 2,4-dichlorophenol, 2,4,6-trichlorophenol, 2,4-dibromophenol, 2,4,6-tribromophenol, or a mixture thereof are preferred.

In this invention, the halogenated phenolic compound can be used in admixture with one or more another organic polar solvents, so long as the amount of the latter is 30% by weight or less.

In this invention, the temperature at which polymerization and imidization are effected is 100° to 200° C., preferably 120° to 200° C., more preferably 140° to 180° C. Although the reaction temperature is preferably kept constant, it may be varied within the above-mentioned range. When the reaction temperature is lower than 100° C., the polymerization and imidization are not sufficient, and a resin having a low conversion to imide can be obtained, so that the storage stability of the reaction solution is lowered. When the reaction temperature is higher than 200° C., the resin gels, so that a resin solution having no fluidity or heterogenity tends to be obtained; this is not preferable.

As a method of charging starting materials in the above-mentioned reaction, there may be used any conventional methods, but in order to obtain a polyimide solution having a higher molecular weight, it is preferable to add the aforesaid tetracarboxylic acid component and diamine component to a halogenated phenolic compound melted with heating at a temperature of 100° to 200° C.

As to the reaction time, it is sufficient that the reaction is effected until the conversion to imide becomes 90% or more, but in usual, it is preferable that the reaction is effected for about 5 minutes to 30 hours while the reaction temperature is maintained in the above-mentioned range. The reaction temperature is properly determined depending upon the molecular weight of the desired resin.

As to the reaction method, the polymerization and imidization are continuously effected while introducing nitrogen and conducting dehydration.

Alternatively, the polymerization and imidization can be conducted initially by reacting the tetracarboxylic acid component and the aromatic diamine component while removing water formed by condensation until the reduced viscosity of the polyimide in the reaction solution becomes 0.1 or higher and successively by continuing the reaction under atmospheric pressure and reflux of water until the rotation viscosity of the reaction solution becomes constant. If the removal of water formed by condensation in the initially conducted reaction is carried out by means of zeolite, the reduced viscosity can easily be controlled. When the dehydration is, if necessary, conducted by means of zeolite or the like after the polymerization and imidization, a polyimide solution excellent in storage stability can be obtained.

In the reaction described above, the total amount of the components except for the solvent is preferably such an amount that the total concentration of individual components is 2 to 25% by weight, preferably 3 to 20% by weight, more preferably 4 to 15% by weight.

The polyimide solution obtained in this invention is a homogeneous and transparent resin solution having a rotation viscosity of 2 to 10,000 poises at 70° C.

When heated to 80° to 200° C., particulary 100° to 160° C., the polyimide solution is lowered in viscosity and can be given a rotation viscosity suitable for forming a coating: therefore a thin layer of the polyimide solution can easily be formed. When the solvent is removed from the thin layer by heating, a polyimide film having excellent physical properties can be obtained.

The polyimide solution obtained in this invention is suitable for forming a film, as mentioned above, and moreover can be used as a varnish for coating electric wire, an adhesive and the like. Further, the polyimide solution obtained in this invention is very stable at a temperature of 50° C. or lower and can be stored for a long period of time.

This invention is explained below in detailed referring to Examples and Comparative Examples.

Here, the water content, rotation viscosity and reduced viscosity were measured in the following manners.

Method of Measuring the Water Content of a Polyimide Resin Solution

Measured by using a Karl Fischer type meter.

Method of Measuring Rotation Viscosity

The measurement was carried out at 70° C. by means of an E type viscometer manufactured by Tokyo Keiki Co., Ltd.

Method of Measuring Reduced Viscosity

By means of an Ubbelohde's viscometer, reduced viscosity was measured under the following conditions and calculated from the following formula:

| Measurement temperature | 50° C. |
|---|---|
| Concentration | 0.1 g/100 ml |
| Solvent | p-chlorophenol |

Reduced viscosity =

$$\left\{\left(\begin{array}{c}\text{Flowing time}\\\text{of solution}\end{array}\right) - \left(\begin{array}{c}\text{Flowing time}\\\text{of solvent}\end{array}\right)\right\} \Big/ \left(\begin{array}{c}\text{Flowing time}\\\text{of solvent}\end{array}\right)$$
$$\overline{\text{Concentration}}$$

EXAMPLE 1

Figure 2:
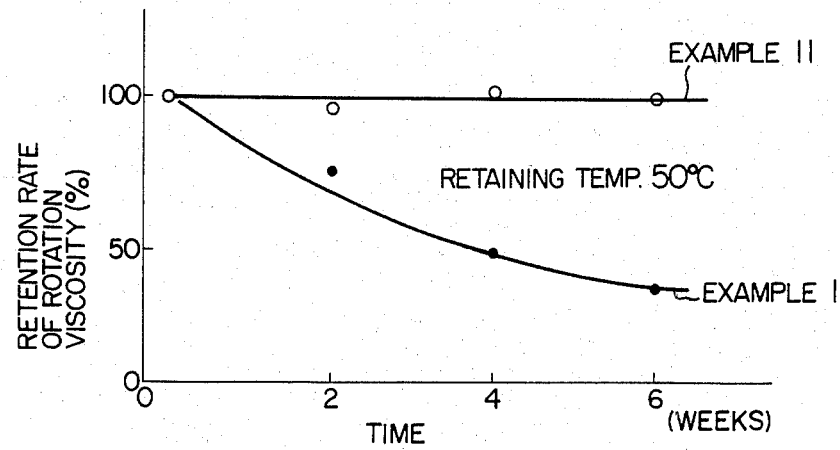
FIG. 2 is a graph showing the storage stability of a polyimide solution.

In a four-necked flask equipped with a thermometer, a stirrer and a nitrogen-introducing tube, 12.88 g (0.04 mole) of BTDA, 2.18 g (0.01 mole) of PMDA, 9.0 g (0.045 mole) of DDE and 0.54 g (0.005 mole) of PPD were added to 230 g of p-chlorophenol heated at 50° C., and the resulting mixture as heated to 160° C. with stirring in about 1.5 hours. Thereafter, the mixture was allowed to react for 3 hours while it was maintained at 160° C., whereby a transparent and viscous polyimide solution was produced. As a result of infrared spectroscopic analysis of the obtained polyimide, a characteristic absorption peak due to imide linkage was observed at 1780 cm$^{-1}$. Since no characteristic absorption peak due to amide linkage was observed, it was found that the polyimide solution contained a polyimide having a conversion to imide of 95% or more. The rotation viscosity and polymer concentration of the polyimide solution are shown in Table 1. Its storage stability is shown in FIG. 2, wherein the retention rate of rotation viscosity with the lapse of time is recorded.

The obtained polyimide solution was heated to 100° C. and filtered, after which the filtrate was casted on a glass plate to a fixed thickness to form a thin layer. The formed thin layer was heated in an oven at 100° C. for about 1 hour to evaporate and remove the p-chlorophenol, whereby a polyimide layer was obtained. Further, the polyimide layer was heated in an oven at 400° C. to remove the p-chlorophenol substantially, whereby a polyimide film was formed.

The tensile strength at break, elongation at break, and glass transition temperature of the thus obtained film are shown in Table 1.

EXAMPLE 2

A polyimide solution was produced in the same manner as in Example 1, except that the addition method was changed to a method by which the tetracarboxylic acid component and the aromatic diamine component were added to p-chlorophenol heated to 160° C. Further, a polyimide film was formed in the same manner as in Example 1.

The properties of the polyimide solution and those of the polyimide film are shown in Table 1.

EXAMPLE 3

A polyimide solution was produced in the same manner as in Example 2, except that the reaction conditions were changed to 180° C. and 1 hour. Further, a polyimide film was formed in the same manner as in Example 1.

The properties of the polyimide solution and those of the polyimide film are shown in Table 1.

EXAMPLE 4

A polyimide solution was produced in the same manner as in Example 2, except that the tetracarboxylic acid components were changed to 10.465 g (0.0325 mole) of BTDA and 3.815 g (0.0175 mole) of PMDA. By use of the obtained polyimide solution, a polyimide film was formed in the same manner as in Example 1.

The properties of the polyimide solution and those of the polyimide film are shown in Table 1.

EXAMPLE 5

A polyimide solution was produced in the same manner as in Example 2, except that the aromatic diamine components were changed to 8.0 g (0.04 mole) of DDE and 1.08 g (0.01 mole) of PPD.

By use of the obtained polyimide solution, a polyimide film was formed in the same manner as in Example 1.

The properties of the polyimide solution and those of the polyimide film are shown in Table 1.

EXAMPLE 6

A polyimide solution was produced in the same manner as in Example 2, except that the tetracarboxylic acid components were changed to 15.295 g (0.0475 mole) of BTDA and 0.545 g (0.0025 mole) of PMDA and the aromatic diamine components to 9.7 g (0.0485 mole) of DDE and 0.162 g (0.0015 mole) of PPD. By use of the obtained polyimide solution, a polyimide film was formed in the same manner as in Example 1. The properties of the polyimide solution and those of the polyimide film are shown in Table 1.

EXAMPLE 7

In the same manner as in Example 1, a polyimide solution was produced by using 16.1 g (0.05 mole) of BTDA and 10 g (0.05 mole) of DDE. By use of the obtained polyimide solution, a polyimide film was formed in the same manner as in Example 2. The properties of the polyimide solution and those of the polyimide film are shown in Table 1.

Note: The glass transition temperature of each film was measured by means of a thermal mechanical analyzer (TMA-1500 manufactured by Shinku Riko Co., Ltd.).

EXAMPLES 8 TO 10

A polyimide solution was produced in the same manner as in Example 2, except that the halogenated phenolic compound was changed to a mixture of 161 g of p-chlorophenol and 69 g of 2,4-dichlorophenol (Example 8), a mixture of 161 g of p-chlorophenol and 69 g of 2,4,6-trichlorophenol (Example 9), or a mixture of 161 g of p-chlorophenol and 69 g of p-bromophenol (Example 10).

By use of each of the thus obtained polyimide solutions, a polyimide film was formed in the same manner as in Example 1.

The properties of the polyimide solutions and those of the thus obtained polyimide films are shown in Table 1.

COMPARATIVE EXAMPLES 1 AND 2

In the same manner as in Example 1, except that the tetracarboxylic acid components and the aromatic diamine components were changed as shown in Table 2, these two kinds of components were subjected to polymerization and imidization. The properties of the thus obtained reaction solutions are shown in Table 2. As shown in Table 2, the reaction solutions obtained in Comparative Examples 1 and 2 could not be used for forming a film because insoluble matters were formed.

TABLE 1

| | Polymerization and imidization | | | | Properties of polyimide solution | | Properties of polyimide film | | | |
|---|---|---|---|---|---|---|---|---|---|---|
| Example | Halogenated phenolic compound | Temp. for adding monomer (°C.) | Reaction temp. (°C.) | Reaction time (hrs) | Appearance | Polymer concentration (%) | Rotation viscosity (70° C.) poises | Thickness (μ) | Tensile strength at break (kg/mm$^2$) | Elongation at break (%) | Glass transition temp. (°C.) |
| 1 | p-Chlorophenol | 50 | 160 | 3 | Transparent and viscous | 10.0 | 500 | 22–27 | 17.1 | 46 | 335 |
| 2 | p-Chlorophenol | 160 | " | " | Transparent and viscous | 10.0 | 1,000 or higher | 25–30 | 18.7 | 65 | 340 |
| 3 | p-Chlorophenol | " | 180 | 1 | Transparent and viscous | 10.1 | 1,000 or higher | 23–29 | 18.1 | 51 | 340 |
| 4 | p-Chlorophenol | " | 160 | 3 | Transparent and viscous | 9.6 | 1,000 or higher | 25–30 | 18.6 | 79 | 345 |
| 5 | p-Chlorophenol | " | " | " | Transparent and viscous | 9.7 | 1,000 or higher | 20–22 | 19.5 | 41 | 360 |
| 6 | p-Chlorophenol | " | " | " | Transparent and viscous | 10.4 | 512 | 22–26 | 16.8 | 40 | 290 |
| 7 | p-Chlorophenol | 160 | 160 | 3 | Transparent and viscous | 10.6 | 480 | 20–23 | 16.6 | 39 | 280 |
| 8 Note 1 | 2,4-Dichlorophenol | 160 | 160 | 3 | Transparent and viscous | 10.0 | 1,000 or higher | 39–41 | 17.7 | 47 | 340 |
| 9 Note 2 | 2,4,6-Trichloro- | " | " | " | Transparent and | 10.0 | 1,000 or higher | 32–36 | 17.3 | 44 | 340 |

TABLE 1-continued

| | Polymerization and imidization | | | | Properties of polyimide solution | | | Properties of polyimide film | | | |
|---|---|---|---|---|---|---|---|---|---|---|---|
| Example | Halogenated phenolic compound | Temp. for adding monomer (°C.) | Reaction temp. (°C.) | Reaction time (hrs) | Appearance | Polymer concentration (%) | Rotation viscosity (70° C.) poises | Thickness (μ) | Tensile strength at break (kg/mm²) | Elongation at break (%) | Glass transition temp. (°C.) |
| 10 Note 3 | phenol p-Bromophenol | " | " | " | viscous Transparent and viscous | 10.0 | 1,000 or higher | 32–37 | 18.5 | 61 | 340 |

Note 1 As a halogenated phenol compound, a mixture of p-chlorophenol/2,4-dichlorophenol (7/3 by weight) was used.
Note 2 As a halogenated phenol compound, a mixture of p-chlorophenol/2,4,6-trichlorophenol (7/3 by weight) was used.
Note 3 As a halogenated phenol compound, a mixture of p-chlorophenol/p-bromophenol (7/3 by weight) was used.

COMPARATIVE EXAMPLE 3

The reaction was effected in the same manner as in Example 1, except that m-cresol was substituted for the p-chlorophenol. The properties of the thus obtained reaction solution are shown in Table 2.

The reaction solution obtained in Comparative Example 3 could not be used for producing a film because an orange-colored matter deposited.

COMPARATIVE EXAMPLE 4

With 11.27 g (0.035 mole) of BTDA were mixed 3.12 g (0.015 mole) of PMDA and 10.0 g (0.05 mole) of DDE, and the resulting mixture was then added to 244 g of p-chlorophenol heated to 50° C. The thus obtained mixture was allowed to react while its temperature was maintained at 50° C., whereby a resin solution having a polymer concentration of 10% by weight was produced. As a result of the infrared spectroscopic analysis of the thus obtained resin, a characteristic absorption peak due to the amide linkage at 3200 to 3300 cm$^{-1}$ was observed, and therefore it was found that the obtained resin solution was a polyamide-acid solution. The obtained polyamide-acid solution was filtered at 50° C., after which the filtrate was casted on a glass plate to a fixed thickness to form a thin layer. The formed thin layer was heated in an oven at 100° C. for about 1 hour to evaporate and remove the p-chlorophenol, whereby a polyamide-acid film was obtained. When the polyamide-acid film was subjected to conversion to imide by heating it in an oven at 400° C., it foamed and no polyimide film capable of withstanding the tests could be obtained.

EXAMPLE 11

In a four-necked flask equipped with a thermometer, a stirrer and a reflux condenser, 12.88 g (0.04 mole) of BTDA, 2.18 g (0.01 mole) of pyromellitic acid dianhydride, 9.0 g (0.045 mole) of DDE and 0.54 g (0.005 mole) of p-phenylenediamine were added to 230 g of p-chlorophenol maintained at 50° C., and the resulting mixture was heated to 130° C. with stirring in about 1.5 hours. When it was heated to 130° C., 3.6 g of molecular sieves of 4 A (manufactured by Wako Pure Chemical Industries, Ltd.) stored in a desicator containing phosphorus pentaoxide was added. After the addition, the resulting mixture was allowed to react at 130° C. for 2 hours and then filtered to obtain a transparent polyimide solution (an intermediate product A).

The obtained intermediate product A had a reduced viscosity of 0.48 (polyimide) and a water content of 0.05% (solution) by weight (0.07 mole % in terms of the amount of water theoretically formed by condensation).

In a four-necked flask equipped with a thermometer, a stirrer and a reflux condenser was placed 200 g of the intermediate product A, and heated to 80° C. with stirring. After the heating, 0.2 g (corresponding to a total water content of 0.28 mole % in terms of the amount of water theoretically formed by condensation) of water was added. After the addition of water, the temperature of the resulting mixture was raised to 130° C., and the mixture was allowed to react. The viscosity of the reaction mixture inceased with the lapse of time, and became constant after 15 hours. The reaction was effected for 20 hours after the temperature was raised to 130° C.

Thereafter, the temperature of the reaction mixture was lowered to 90° C., and 6 g of molecular sieves of 4 A was added. The resulting mixture was stirred at said

TABLE 2

| | Polymerization and imidization | | | | | |
|---|---|---|---|---|---|---|
| Comparative Example | Tetracarboxylic acid component | Aromatic diamine component | Reaction solvent | Reaction conditions Temp. (°C.) | Time (hrs) | Properties of reaction solution Appearance |
| 1 | PMDA (1.0 mole) | DDE (0.85 mole) PPD (0.15 mole) | p-Chlorophenol | 160 | 2 | Orange-colored insoluble matter deposited |
| 2 | BTDA (0.8 mole) PMDA (0.2 mole) | PPD (1.0 mole) | p-Chlorophenol | " | " | Orange-colored insoluble matter deposited |
| 3 | BTDA (0.8 mole) PMDA (0.2 mole) | DDE (0.85 mole) PPD (0.15 mole) | m-Cresol | " | " | Orange-colored insoluble matter deposited in the course of raising the temp. | temperature for 1 hour and, then filtered to obtain a transparent and viscous polyimide solution.

As a result of the infrared spectroscopic analysis of the obtained polyimide, a characteristic absorption peak due to the imide linkage was observed at 1780 cm$^{-1}$, and no characteristic absorption peak due to the amide linkage was observed. Therefore, it was found that the polyimide solution contained a polyimide having a conversion to imide of 95% or more. The storage stability of the obtained polyimide resin solution is shown in FIG. 2. The obtained polyimide solution had a reduced viscosity of 2.11 and a water content of 0.012% by weight (0.017 mole % in terms of the amount of water theoretically formed by condensation). It was so excellent that a polyimide film formed therefrom had tensile strength at break of 16.9 kg/cm$^2$ and elongation at break of 52%.

By employing the above-mentioned monomer composition, solvent, and production process, there can be obtained a transparent and homogeneous polyimide solution from which a film excellent in mechanical properties can be formed.

What is claimed is:

1. A process for producing a homogeneous polyimide solution which comprises effecting polymerization and imidization concurrently at a reaction temperature of 100° to 200° C. in the presence of a halogenated phenolic compound as a solvent by reacting a tetracarboxylic acid component and an aromatic diamine component while initially removing water formed by condensation until the reduced viscosity of the polyimide in the reaction solution becomes 0.1 or higher and successively continuing the reaction under atmospheric pressure and reflux of water until the rotation viscosity of the reaction solution becomes constant; the tetracarboxylic acid component comprising at least 50 mole % of 3,3',4,4'-benzophenonetetracarboxylic acid or an anhydride or an ester thereof and 50 mole % or less of pyromellitic acid or an anhydride or an ester thereof and the aromatic diamine component comprising at least 75 mole % of 4,4'-diamino-diphenyl ether and 25 mole % or less of p-phenylenediamine, both the tetracarboxylic acid component and the aromatic diamine component being used in approximately equimolar amounts in a concentration that provides a transparent and homogeneous polyimide solution from which a polyimide film can be formed and the polymerization and the imidization being conducted until the degree of imidazation of said polyimide is 90% or more.

2. A process according to claim 1, wherein the tetracarboxylic acid component and the diamine component are added to a halogenated phenolic compound melted with heating at a temperature of 100° to 200° C., followed by the reaction of these components.

3. A process according to claim 1, wherein the reaction is initially effected in the presence of a zeolite which is in a dry condition when added to the reaction solution.

4. A process according to claim 1, wherein further dehydration is conducted after polymerization and imidization.

5. A process according to claim 4, wherein the further dehydration is conducted by using zeolite.

6. A process according to claim 1, wherein a tetracarboxylic acid component comprising 70 to 90 mole % of 3,3',4,4'-benzophenonetetracarboxylic acid or an anhydride or an ester thereof and 30 to 10 mole % of pyromellitic acid or an anhydride or an ester thereof is reacted with a diamine component comprising 80 to 95 mole % of a 4,4'-diamino-diphenyl ether and 20 to 5 mole % of p-phenylenediamine.

7. A process according to claim 1, wherein the anhydride of 3,3',4,4'-benzophenonetetracarboxylic acid is 3,3',4,4'-benzophenonetetracarboxylic acid dianhydride.

8. A process according to claim 1, wherein the anhydride of pyromellitic acid is pyromellitic acid dianhydride.

9. A process according to claim 1, wherein the halogenated phenolic compound is one having a melting point of 80° C. or lower and a boiling point of 280° C. or lower.

10. A process according to claim 1, wherein the halogenated phenolic compound is a brominated or chlorinated phenolic compound.

11. A process according to claim 1, wherein the halogenated phenolic compound is p-chlorophenol, m-chlorophenol, p-bromophenol, m-bromophenol, 2,4-dichlorophenol, 2,4,6-trichlorophenol, 2,4-dibromophenol, 2,4,6-tribromophenol or a mixture thereof.

12. The product produced by the process of claim 1.

13. A polyimide film obtained by forming a thin layer of the resin solution obtained by the process of claim 1 and removing the solvent therefrom by heating.

14. A process according to claim 1, wherein the polymerization and imidization are effected while introducing nitrogen and conducting dehydration.

15. A process according to claim 1, wherein the concentration of the tetracarboxylic acid component and the diamine component in the solvent is 2 to 25% by weight.

16. A process according to claim 1, wherein the tetracarboxylic acid component comprises at least 50 mole % of 3,3',4,4'-benzophenonetetracarboxylic acid and 50 mole % or less of pyromellitic acid.

* * * * *

UNITED STATES PATENT AND TRADEMARK OFFICE
CERTIFICATE OF CORRECTION

PATENT NO. : 4,511,681
DATED : April 16, 1985
INVENTOR(S) : YOSHIDA, et al

It is certified that error appears in the above-identified patent and that said Letters Patent is hereby corrected as shown below:

Title page, left-hand column, the assignee's name "HITACHI CHEMICAL COMPANY" should read --HITACHI CHEMICAL COMPANY, LTD.--

Signed and Sealed this

Twenty-fourth Day of June 1986

[SEAL]

Attest:

DONALD J. QUIGG

Attesting Officer

Commissioner of Patents and Trademarks